United States Patent

Headge

[11] Patent Number: 5,673,642
[45] Date of Patent: Oct. 7, 1997

[54] FLOATATION APPARATUS FOR A VEHICLE

[76] Inventor: Ron Headge, P.O. Box 6052, Fort McMurray, Alberta, Canada, T9H 4WI

[21] Appl. No.: 638,159

[22] Filed: Apr. 26, 1996

[30] Foreign Application Priority Data

May 5, 1995 [CA] Canada ................................ 2148774

[51] Int. Cl.$^6$ .................................................. B63B 43/14
[52] U.S. Cl. .......................................................... 114/123
[58] Field of Search ........................... 114/61, 123, 270; 440/11, 12

[56] References Cited

U.S. PATENT DOCUMENTS

| | | | |
|---|---|---|---|
| 655,234 | 8/1900 | Howe et al. | 114/123 |
| 4,593,640 | 6/1986 | Blunschi | 114/123 |
| 4,664,051 | 5/1987 | Newkirk | 114/123 |
| 4,687,447 | 8/1987 | Hannappel | 114/123 |
| 5,038,697 | 8/1991 | Farrier | 114/123 |

OTHER PUBLICATIONS

Brochure for The WaterBug available at least as early as Jan. 1995.

*Primary Examiner*—Stephen Avila
*Attorney, Agent, or Firm*—Anthony R. Lambert

[57] ABSTRACT

A floatation apparatus for a vehicle includes a first floatation member, a second floatation member, and at least two arms. Each of the two arms have a floatation attachment end and a mounting end. The floatation attachment end of one of the two arms is secured to the first floatation member and the floatation attachment end of the other of the two arms is secured to the second floatation member. At least one support is provided that mounts to a vehicle. The mounting ends of the two arms are pivotally mounted to the support for movement between a substantially vertical stored position and a downwardly angled operative position. The arms can be locked in either the stored position or the operative position.

6 Claims, 4 Drawing Sheets

FLOATATION APPARATUS FOR A VEHICLE

FIELD OF THE INVENTION

The present invention relates to a floatation apparatus for a vehicle and, in particular, for a four wheeled all terrain vehicle commonly known as a "quad".

BACKGROUND OF THE INVENTION

All terrain vehicles can wade across shallow bodies of water. In order to traverse bodies of water that are too deep to wade through, the all terrain vehicles must be equipped with a floatation apparatus. The floatation apparatus generally consists of pontoon-like floatation members secured to the sides of the all terrain vehicle. The problem with the use of such floatation apparatus is that the floatation members increase the overall width dimension of the all terrain vehicle and thereby limit the ability of the vehicle to manoeuvre in confined areas.

SUMMARY OF THE INVENTION

What is required is a floatation apparatus for a vehicle which will not impair the vehicles manoeuvrability.

According to the present invention there is provided a floatation apparatus for a vehicle which includes a first floatation member, a second floatation member, and at least two arms. Each of the two arms have a floatation attachment end and a mounting end. The floatation attachment end of one of the two arms is secured to the first floatation member and the floatation attachment end of the other of the two arms is secured to the second floatation member. At least one support is provided that includes means for mounting to a vehicle. The mounting ends of the two arms are pivotally mounted to the support for movement between a substantially vertical stored position and a downwardly angled operative position. Means is provided for locking the arms in one of the stored position and the operative position.

With the floatation apparatus for a vehicle, as described above, the floatation members can be raised to the substantially vertical stored position when maneuvering on land and then lowered to an operative position when required. It is preferred that four arms be used, with an arm secured to each end of each floatation member. This configuration stabilizes the floatation member and allows a lighter gauge of arm to be used.

Although beneficial results may be obtained through the use of the floatation apparatus for a vehicle, as described above, stresses are created in the floatation apparatus when the arms are locked in either of the stored position or the operative position. If the means for locking the arms in the stored position and the operative position are not of sufficient strength a failure can occur. Even more beneficial results have been obtained when the means for locking the arms includes at least two brace members each having an arm engaging end and a mounting end. The mounting end of each of the brace members is pivotally secured to the at least one support. The arm engaging ends of each of the two brace members include means for attaching the arm engaging ends to a selected one of a stored mounting position and an operative mounting position along the length of one of the two arms.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
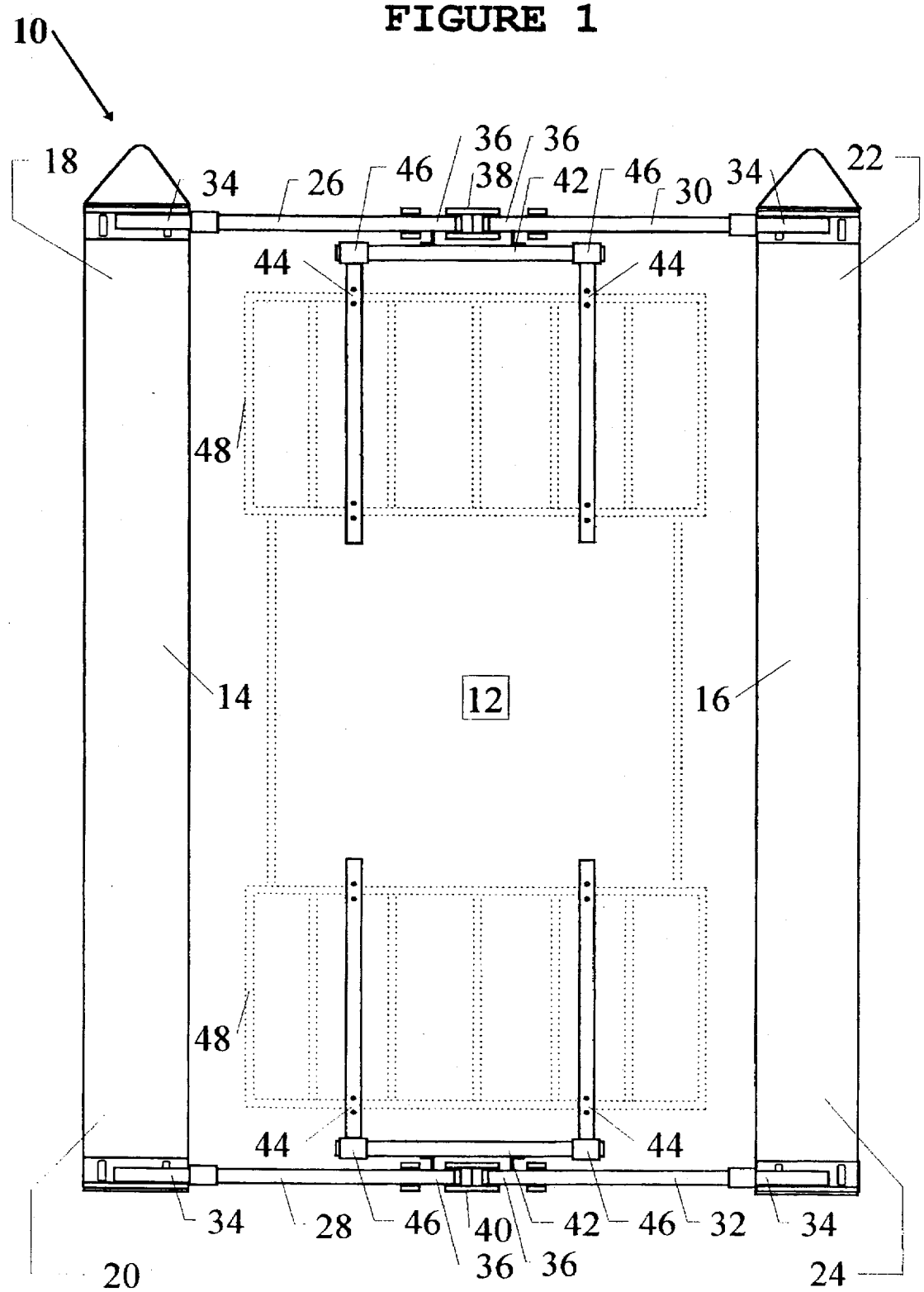
FIG. 1 is a top plan view of a floatation apparatus for a vehicle constructed in accordance with the teachings of the present invention.

The preferred embodiment, a floatation apparatus for a vehicle generally identified by reference numeral 10, will now be described with reference to FIGS. 1 through 4.

Figure 2:
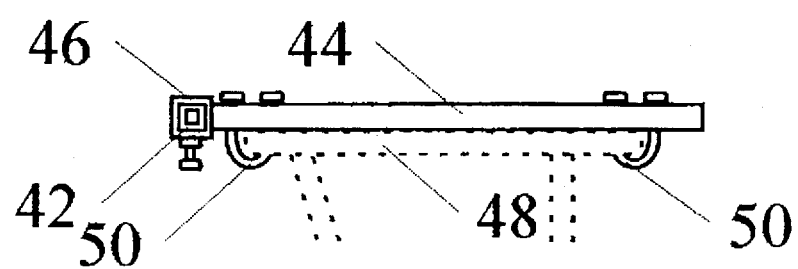
FIG. 2 is a detailed side elevation view showing the means for attachment of the floatation apparatus illustrated in FIG. 1 to an all terrain vehicle.
Figure 3:
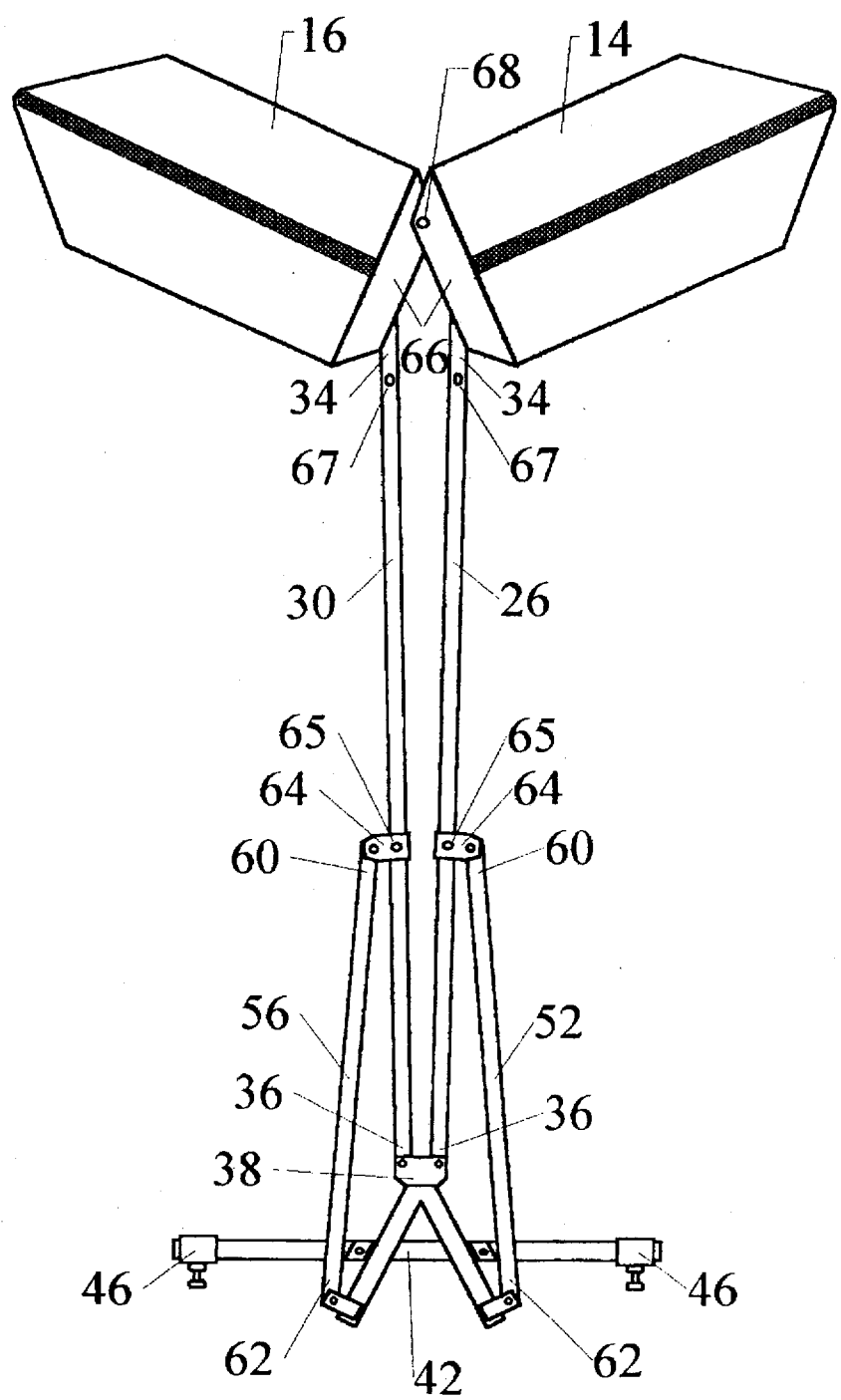
FIG. 3 is a rear elevation view of the floatation apparatus for a vehicle illustrated in FIG. 1, with floatation members in a stored position.
Figure 4:
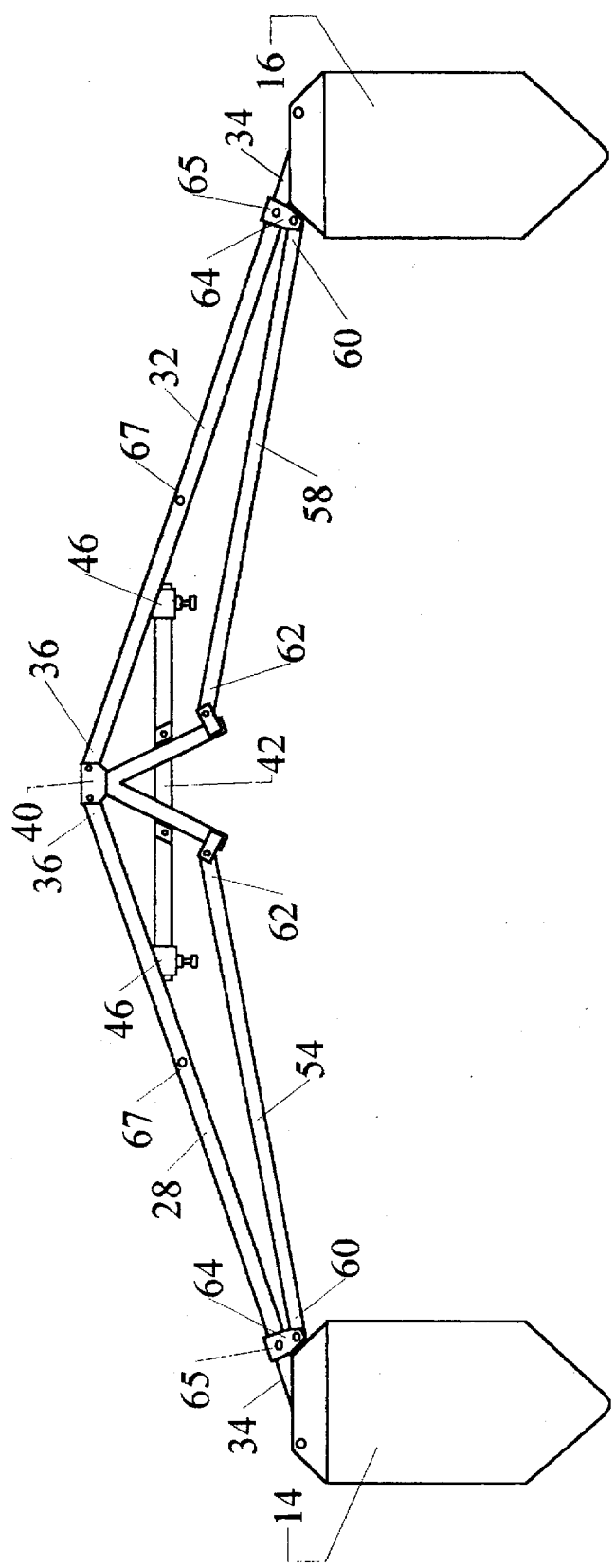
FIG. 4 is a front elevation view of the floatation apparatus for a vehicle illustrated in FIG. 1, with floatation members in an operative position.

Referring to FIG. 1, floatation apparatus 10 is mounted on a vehicle 12. Floatation apparatus 10 includes a first floatation member 14 and a second floatation member 16. First floatation member 14 has a first end 18 and a second end 20. Second floatation member 16 has a first end 22 and a second end 24. A total of four arms are provided; a first arm 26, a second arm 28, a third arm 30 and a fourth arm 32. Each arm has a floatation attachment end 34 and a mounting end 36. Floatation attachment end 34 of first arm 26 is secured adjacent to first end 18 of first floatation member 14. Floatation attachment end 34 of second arm 28 is secured adjacent to second end 20 of first floatation member 14. Floatation attachment end 34 of third arm 30 is secured adjacent to first end 22 of second floatation member 16. Floatation attachment end 34 of fourth arm 32 is secured adjacent to second end 24 of second floatation member 16. A first support 38 and a second support 40 are provided. Both first support 38 and second support 40 have means for mounting to vehicle 12. The means for mounting to vehicle 12 include a transverse mounting bar 42. The transverse mounting bar 42 has horizontal mounting members 44 which extend substantially perpendicularly from transverse mounting bar 42 in parallel spaced relation. Horizontal mounting members 44 have sleeves 46 through which transverse mounting bar 42 extends. The spacing between horizontal mounting members 44 is telescopically adjustable by sliding sleeves 46 along transverse mounting bar 42. Sleeves 46 are bolted in position when the desired spacing is achieved. Most all terrain vehicles have racks 48 mounted at both the front and the rear. Vehicle 12, is illustrated in FIG. 1, with such racks. Referring to FIG. 2, there is illustrated the manner in which transverse mounting bar 42 and horizontal mounting members 44 are secured to racks 48 with U bolts 50. Referring to FIG. 1, mounting ends 36 of first arm 26 and third arm 30 are pivotally mounted to first support 38. Mounting ends 36 of second arm 28 and fourth arm 32 are pivotally mounted to second support 40. The pivotal movement of each of the arms is between a substantially vertical stored position, as illustrated in FIG. 3, and a downwardly inclined operative position, as illustrated in FIG. 4. The means for locking the arms in one of the stored position and the operative position includes a plurality of brace members; a first brace member 52, a second brace member 54, a third brace member 56, and a fourth brace member 58. Each of the brace members has an arm engaging end 60 and a mounting end 62. Referring to FIG. 3, mounting end 62 of first brace member 52 is pivotally secured to first support 38, while arm engaging end 60 of first brace member engages first arm 26. Mounting end 62 of third brace member 56 is pivotally secured to first support 38, while arm engaging end 60 of third brace member 56 engages third arm 30. Referring to FIG. 4, mounting end 62 of second brace member 54 is pivotally secured to second support 40, while arm engaging end 60 of second brace member 54 engages second arm 28. Mounting end 62 of fourth brace member 58 is pivotally secured to second support 40, while arm engaging end 60 of fourth brace member 58 engages fourth arm 32. The means of engagement between the arms and the brace members includes a sleeve 64 secured to the brace member that slides along the length of the arm. The sleeve can be bolted in either a stored mounting position, as illustrated in FIG. 3, or in an operative mounting position, as illustrated in FIG. 4. This is accomplished by aligning apertures 65 in sleeve 64 with apertures 67 in the arms and extending bolts (now shown) therethrough. Referring to FIG. 3, as a safety precaution it is preferred that in the stored position first floatation member 14 be secured to second floatation member 16. This is accomplished by overlapping flanges 66 from the floatation members 14 and 16 and extending a bolt 68 through aligned apertures (not shown).

The use and operation of floatation apparatus 10 will now be described with reference to FIGS. 1 through 4. Referring to FIGS. 1 and 2, transverse mounting bar 42 and horizontal mounting members 44 are secured to racks 48 of vehicle 12 with U bolts 50. Vehicle 12 is normally operative with floatation apparatus 10 in the stored position illustrated in FIG. 3. When floatation apparatus 10 is required the arms must be pivoted into the operative position illustrated in FIG. 4. There are two impediments to such movement. The first impediment is that first floatation member 14 and second floatation member are secured together. The second impediment is that sleeve 64 of each of the brace members are secured in the stored mounting position. Bolt 68 must be removed from overlapping flanges 66 to disconnect first floatation member 14 from second floatation member 16. Bolts, not shown, are then removed from apertures 65 in sleeve 64 of the brace members and apertures 67 in the arms to permit relative movement of the brace members and the arms. The arms can then be moved to the operative position illustrated in FIG. 4. As the arms are moved, sleeves 64 slide freely along the arms. Once the arms are in the operative position, bolts (not shown) can be reinserted through apertures 65 in each sleeve 64 and apertures 67 in each arm, to lock arm engaging end 60 of each of the brace members in the operative mounting position.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A floatation apparatus for a vehicle, comprising:

a first floatation member having a first end and a second end;

a second floatation member having a first end and a second end;

a first arm having a floatation attachment end and a mounting end, the floatation attachment end of the first arm being secured adjacent to the first end of the first floatation member;

a second arm having a floatation attachment end and a mounting end, the floatation attachment end of the second arm being secured adjacent to the second end of the first floatation member;

a third arm having a floatation attachment end and a mounting end, the floatation attachment end of the third arm being secured adjacent to the first end of the second floatation member;

a fourth arm having a floatation attachment end and a mounting end, the floatation attachment end of the fourth arm being secured adjacent to the second end of the second floatation member;

a first support including means for mounting to a vehicle, the mounting ends of the first arm and the third arm being pivotally mounted to the first support for movement between a substantially vertical stored position and a downwardly inclined operative position;

a second support including means for mounting to a vehicle, the mounting ends of the second arm and the fourth arm being pivotally mounted to the second support for movement between a substantially vertical stored position and a downwardly inclined operative position; and means for looking the arms in one of the stored position and the operative position including:

a first brace member having an arm engaging end and a mounting end, the mounting end of the first brace member being pivotally secured to the first support, the arm engaging end of the first brace member including means for attaching the arm engaging end to a selected one of a stored mounting position and an operative mounting position along the length of the first arm;

a second brace member having an arm engaging end and a mounting end, the mounting end of the second brace member being pivotally secured to the first support, the arm engaging end of the second brace member including means for attaching the arm engaging end to a selected one of a stored mounting position and an operative mounting position along the length of the second arm;

a third brace member having an arm engaging end and a mounting end, the mounting end of the third brace member being pivotally secured to the second support, the arm engaging end of the third brace member including means for attaching the arm engaging end to a selected one of a stored mounting position and an operative mounting position along the length of the third arm; and a fourth brace member having an arm engaging end and a mounting end, the mounting end of the fourth brace member being pivotally secured to the second support, the arm engaging end of the fourth brace member including means for attaching the arm engaging end to a selected one of a stored mounting position and an operative mounting position along the length of the fourth arm.

2. The floatation apparatus for a vehicle as defined in claim 1, wherein each of the first support and the second support are secured to transverse mounting bars, the transverse mounting bars having horizontal mounting members extending substantially perpendicularly in parallel spaced relation.

3. The floatation apparatus for a vehicle as defined in claim 2, wherein the spacing between the horizontal mounting members being telescopically adjustable along the transverse mounting bars.

4. A floatation apparatus for a vehicle, comprising:

a first floatation member having a first end and a second end;

a second floatation member having a first end and a second end;

a first arm having a floatation attachment end and a mounting end, the floatation attachment end of the first arm being secured adjacent to the first end of the first floatation member;

a second arm having a floatation attachment end and a mounting end, the floatation attachment end of the second arm being secured adjacent to the second end of the first floatation member;

a third arm having a floatation attachment end and a mounting end, the floatation attachment end of the third arm being secured adjacent to the first end of the second floatation member;

a fourth arm having a floatation attachment end and a mounting end, the floatation attachment end of the fourth arm being secured adjacent to the second end of the second floatation member;

a first support including means for mounting to a vehicle, the mounting ends of the first arm and the third arm being pivotally mounted to the first support for movement between a substantially vertical stored position and a downwardly inclined operative position;

a second support including means for mounting to a vehicle, the mounting ends of the second arm and the fourth arm being pivotally mounted to the second support for movement between a substantially vertical stored position and a downwardly inclined operative position; and means for locking the arms in one of the stored position and the operative position including:

a first brace member having an arm engaging end and a mounting end, the mounting end of the first brace member being pivotally secured to the first support, the arm engaging end of the first brace member including means for attaching the arm engaging end to a selected one of a stored mounting position and an operative mounting position along the length of the first arm;

a second brace member having an arm engaging end and a mounting end, the mounting end of the second brace member being pivotally secured to the first support, the arm engaging end of the second brace member including means for attaching the arm engaging end to a selected one of a stored mounting position and an operative mounting position along the length of the second arm;

a third brace member having an arm engaging end and a mounting end, the mounting end of the third brace member being pivotally secured to the second support, the arm engaging end of the third brace member including means for attaching the arm engaging end to a selected one of a stored mounting position and an operative mounting position along the length of the third arm; and a fourth brace member having an arm engaging end and a mounting end, the mounting end of the fourth brace member being pivotally secured to the second support, the arm engaging end of the fourth brace member including means for attaching the arm engaging end to a selected one of a stored mounting position and an operative mounting position along the length of the fourth arm.

5. The floatation apparatus for a vehicle as defined in claim 4, wherein each of the first support and the second support are secured to transverse mounting bars, the transverse mounting bars having horizontal mounting members extending substantially perpendicularly in parallel spaced relation.

6. The floatation apparatus for a vehicle as defined in claim 5, wherein the spacing between the horizontal mounting members being telescopically adjustable along the transverse mounting bars.

* * * * *